United States Patent
Li et al.

(10) Patent No.: US 12,355,858 B2
(45) Date of Patent: Jul. 8, 2025

(54) METHOD AND APPARATUS FOR ENCRYPTING AND DECRYPTING AND READING AND WRITING MESSAGES, COMPUTER DEVICE, AND STORAGE MEDIUM

(71) Applicant: BIGO TECHNOLOGY PTE. LTD., Singapore (SG)

(72) Inventors: Yan Li, Guangzhou (CN); Dong Li, Guangzhou (CN); Gengshu Chen, Guangzhou (CN)

(73) Assignee: BIGO TECHNOLOGY PTE. LTD., Singapore (SG)

( * ) Notice: Subject to any disclaimer, the term of this patent is extended or adjusted under 35 U.S.C. 154(b) by 207 days.

(21) Appl. No.: 17/782,939

(22) PCT Filed: Oct. 13, 2020

(86) PCT No.: PCT/CN2020/120578
§ 371 (c)(1),
(2) Date: Jun. 6, 2022

(87) PCT Pub. No.: WO2021/114850
PCT Pub. Date: Jun. 17, 2021

(65) Prior Publication Data
US 2023/0027142 A1   Jan. 26, 2023

(30) Foreign Application Priority Data
Dec. 9, 2019   (CN) .......................... 201911250793.1

(51) Int. Cl.
*H04L 9/00*   (2022.01)
*H04L 9/06*   (2006.01)
*H04L 9/08*   (2006.01)

(52) U.S. Cl.
CPC ............ *H04L 9/002* (2013.01); *H04L 9/0643* (2013.01); *H04L 9/0869* (2013.01); *H04L 2209/16* (2013.01)

(58) Field of Classification Search
CPC ..... H04L 9/002; H04L 9/0643; H04L 9/0869; H04L 2209/16; H04L 9/0637
See application file for complete search history.

(56) References Cited

U.S. PATENT DOCUMENTS

| | | | |
|---|---|---|---|
| 8,209,549 B1 * | 6/2012 | Bain, III | G06Q 20/382 705/64 |
| 10,608,813 B1 * | 3/2020 | Lazier | G06F 21/602 |

(Continued)

FOREIGN PATENT DOCUMENTS

| | | | | |
|---|---|---|---|---|
| AU | 2018100581 A4 | * | 6/2018 | |
| CN | 101401341 A | * | 4/2009 | G06F 21/62 |

(Continued)

OTHER PUBLICATIONS

Extended European Search Report Communication Pursuant to Rule 62 EPC, dated Dec. 23, 2022 in Patent Application No. EP20899533.2, which is a foreign counterpart application to which this application claims priority.

(Continued)

*Primary Examiner* — Mohammed Waliullah
(74) *Attorney, Agent, or Firm* — Kolitch Romano Dascenzo Gates LLC

(57) ABSTRACT

A method for encrypting messages is provided. The method for encrypting messages includes: generating a seed; generating a mask based on the seed; generating a masked message by masking an original message using the mask; acquiring a target message by performing white box encryption on the masked message; and disclosing the target message and the seed.

17 Claims, 6 Drawing Sheets

(56) References Cited

U.S. PATENT DOCUMENTS

| | | | |
|---|---|---|---|
| 2009/0217385 A1* | 8/2009 | Teow | G06F 21/604 726/27 |
| 2011/0007098 A1* | 1/2011 | Park | G09G 3/3611 345/88 |
| 2011/0013639 A1* | 1/2011 | Matthews | H04L 45/22 370/395.32 |
| 2011/0013767 A1 | 1/2011 | Kim et al. | |
| 2011/0085662 A1* | 4/2011 | Myers | H03K 19/17768 380/252 |
| 2012/0179920 A1 | 7/2012 | Farrugia et al. | |
| 2015/0195670 A1* | 7/2015 | Agee | H04B 1/7103 375/144 |
| 2016/0080143 A1 | 3/2016 | Kindarji et al. | |
| 2017/0195117 A1 | 7/2017 | Wu | |
| 2017/0324542 A1 | 11/2017 | Drexler et al. | |
| 2018/0367297 A1 | 12/2018 | Bauer et al. | |
| 2019/0305930 A1 | 10/2019 | Bauer | |
| 2019/0320303 A1* | 10/2019 | Agee | H04B 1/7103 |
| 2020/0252392 A1* | 8/2020 | Mullins | H04L 63/0838 |

FOREIGN PATENT DOCUMENTS

| | | | | |
|---|---|---|---|---|
| CN | 106059752 A | * | 10/2016 | H04L 9/065 |
| CN | 106663387 A | | 5/2017 | |
| CN | 107005404 A | | 8/2017 | |
| CN | 108369784 A | | 8/2018 | |
| CN | 108964870 A | * | 12/2018 | H04B 1/59 |
| CN | 109478995 A | | 3/2019 | |
| CN | 111010266 A | | 4/2020 | |
| KR | 20070086008 A | * | 6/2007 | |
| WO | WO-2013104837 A1 | * | 7/2013 | G06F 21/72 |

OTHER PUBLICATIONS

Brakerski, Zvika, et al.; "Monotone Batch NP—Delegation with Applications to Access Control", IACR, International Association for Cryptologic Research, pp. 1-33, p. 21, second paragraph, last sentence; May 13, 2018.

Brandao, Luis T.A.N.; "Very-efficient Simulatable Flipping of Many Coins into a Well", IACR, International Association for Cryptologic Research, pp. 1-97, Section 5.1.1 up to p. 17, second paragraph; Jun. 29, 2015.

International Search Report of the International Searching Authority for State Intellectual Property Office of the People's Republic of China in PCT application No. PCT/CN2020/120578 issued on Dec. 31, 2020, which is an international application corresponding to this U.S. application.

The State Intellectual Property Office of People's Republic of China, First Office Action in Patent Application No. CN201911250793.1 issued on May 7, 2022, which is a foreign counterpart application corresponding to this U.S. Patent Application, to which this application claims priority.

Cho, Jihoon, et al., "Hybrid WBC: Secure and Efficient Encryption Schemes Using the White-Box Cryptography." IACR eprint archive 800, 2015.

Chow, Stanley, et al., "White-Box Cryptography and an AES Implementation." In International Workshop on Selected Areas in Cryptography, pp. 250-270. Springer, Berlin, Heidelberg, 2002.

Keller, Sharon S. et al., "The Secure Hash Algorithm 3 Validation System (SHA3VS)", Apr. 7, 2016, National Institute of Standards and Technology Information Technology Laboratory.

Liu, Jun, et al., "A New Digital Rights Management Solution Based on White-Box Cryptography." IACR Cryptology ePrint Archive 2017 (2017): 1010.

Muir, James A., "A Tutorial on White-Box AES." In Advances in Network Analysis and its Applications, pp. 209-229. Springer, Berlin, Heidelberg, Feb. 22, 2012.

Xiao, Yaying, et al., "A Secure Implementation of White-Box AES." In 2009 2nd International Conference on Computer Science and its Applications, pp. 1-6. IEEE, 2009.

Dynamic White-Box Cryptography, https://www.aqniu.com/tools-tech/27536.html.

JiWei Cloud white-box crypto SDK, https://www.kiwisec.com/product/secure-key-box-iot.html.

Tencent Cloud White-Box Crypto SDK, https://cloud.tencent.com/document/product/573/43178.

* cited by examiner

METHOD AND APPARATUS FOR ENCRYPTING AND DECRYPTING AND READING AND WRITING MESSAGES, COMPUTER DEVICE, AND STORAGE MEDIUM

CROSS-REFERENCE TO RELATED APPLICATION

This application is a U.S. national stage of international application No. PCT/CN2020/120578, filed on Oct. 13, 2020, which claims priority to Chinese Patent Application No. 201911250793.1, filed on Dec. 9, 2019, the disclosures of which are incorporated herein by reference in their entireties.

TECHNICAL FIELD

The present disclosure relates to the field of security technologies, and in particular, relates to a method and apparatus for encrypting messages, a method and apparatus for decrypting messages, a method and apparatus for writing messages, a method and apparatus for reading messages, a computer device, and a storage medium therein.

BACKGROUND

A data protection technology in a computer device is strongly correlated with cryptography. Sensitive data usually needs to be hidden through encryption in the fields of shell adding, reverse debugging, data storage, and the like. However, the hidden sensitive data may be attacked by using a black box, a gray box, a white box, or the like.

SUMMARY

The present disclosure provides a method and apparatus for encrypting messages, a method and apparatus for decrypting messages, a method and apparatus for writing messages, a method and apparatus for reading messages, a computer device, and a storage medium therein.

A method for encrypting messages is provided. The method includes:
generating a seed;
generating a mask based on the seed;
generating a masked message by masking an original message using the mask;
acquiring a target message by performing white-box encryption on the masked message; and
disclosing the target message and the seed.

A method for decrypting messages is further provided. The method includes:
determining a target message and a seed;
acquiring a masked message by performing white-box decryption on the target message;
generating a mask based on the seed; and
acquiring an original message by unmasking the masked message using the mask.

A method for writing messages is further provided. The method includes:
generating a seed in response to receiving an original message generated by an application;
generating a mask based on the seed;
generating a masked message by masking the original message using the mask;
acquiring a target message by performing white-box encryption on the masked message; and
storing, correspondingly to the original message, the target message and the seed.

DETAILED DESCRIPTION

White box is that an attacker has completely controlled an entire operation process and the entire operation process is completely visible. The attacker can freely observe a dynamic password running process; and detailed content of an internal algorithm is completely visible and can be modified at will.

For example, software is running locally. The attacker can run a program through a debugger and observe a running process of the software. In this way, all code in a decryption portion is completely visible.

Some white-box encryption algorithms have been published to guarantee data security, for example, a white-box encryption algorithm meeting an advanced encryption standard (AES). In a case that a white-box encryption algorithm is deployed into an application executed on an open device, a developer may implement the white-box encryption algorithm in a semantically insecure mode or an inefficient mode. Some examples of the modes are explained as follows:

Electronic code book (ECB) mode: A white-box encryption algorithm in the ECB mode encrypts identical blocks into identical ciphertexts, which can expose a plaintext easily.

Cipher block chaining (CBC) mode: A problem of propagating un-authenticated encryption by mistake can be caused. Leakage of information of a first block of a plaintext can be caused by reusing an initialization vector (IV). It is not practical to generate, hide, and remember each dynamic IV of a white-box encryption algorithm on a client.

Counter (CTR) mode: A white-box encryption algorithm is used in a stream cipher. In a case that an IV is reused, security is breached completely, and protection provided by white-box encryption is bypassed.

In real application environment, a white-box encryption algorithm is used to encrypt a single block. Generally, a message includes a plurality of blocks. As a result, the entire message is semantically risky under a chosen-plaintext attack (CPA).

The present disclosure is provided to solve a problem that white-box encryption of a message is risky under a CPA mode.

The present disclosure is described below with reference to the accompanying drawings and embodiments.

Embodiment 1

Figure 1:
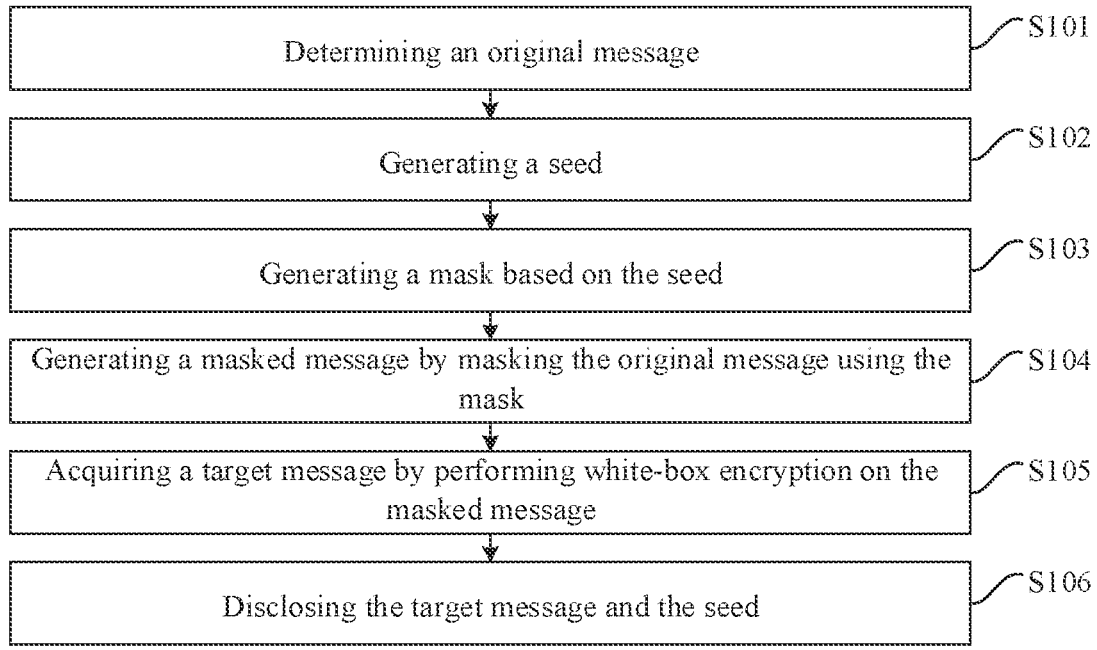
FIG. 1 is a flowchart of a method for encrypting messages according to Embodiment 1 of the present disclosure.

FIG. 1 is a flowchart of a method for encrypting messages according to Embodiment 1 of the present disclosure. The embodiment provides a chosen-plaintext attack (CPA)-resistant white-box encryption scheme. Different ciphertexts are generated for different blocks in a message by adding a mask generation function (MGF). The MGF is merged with a white-box encryption algorithm in a white-box encryption application programming interface (API). The method may be performed by an apparatus for encrypting messages. The apparatus for encrypting messages may be implemented by using software and/or hardware, and may be configured in a computer device, for example, a mobile terminal (such as a mobile phone, a tablet computer, or an intelligent wearable device (such as a smart watch or smart glasses)), a personal computer, a server, or the like.

For a local device such as a mobile terminal and a personal computer, white-box encryption may be implemented in a form of a built-in module of an application, a plugin, or the like.

For a non-local device such as a server, the white-box encryption may be implemented in a form of a software development kit (SDK). A user first selects a key, and then initializes the white-box encryption based on the key by using the server. After the initialization is completed, a key is generated in a non-plaintext format and stored in a cloud. The application (client) needs to access the key via a cloud API. The white-box encryption implemented on the server eliminates a risk of performing reverse engineering on the local device. The application (client) accomplishes an encryption operation (for example, retrieving a key) by communicating with the server.

As shown in FIG. 1, the method includes the following processes.

In S101, an original message is determined.

Figure 2:
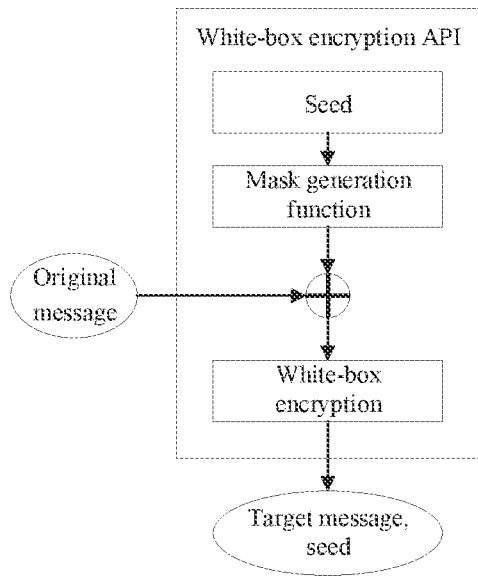
FIG. 2 is a schematic diagram of a white-box encryption application programming interface (API) according to an embodiment of the present disclosure.

As shown in FIG. 2, the original message is provided to a white-box encryption API as an input for encryption.

The original message is a plaintext and may include one or more blocks.

A form of the original message varies with a scenario. For example, for a local device such as a mobile terminal, the original message may be a key. That is, key pre-embedding is performed in the white-box encryption manner of this embodiment, which greatly reduces the risk of performing reverse engineering on the local device.

In response to a length of the original message being insufficient, the original message may be filled with specified data, such as public key cryptography standards #7 (PKCS #7). The original message filled with the specified data is provided to the white-box encryption API as the input.

In response to the length of the original message being sufficient, the original message may be directly provided to the white-box encryption API as the input, which is not limited in the embodiment.

In S102, a seed is generated.

As shown in FIG. 2, upon receiving the input original message, the white-box encryption API may generate the seed. The seed is unique and not be reused. The seed may be at least one of a number, a string and a character. And the seed may be disclosed as an output of the white-box encryption API.

A length of the seed is generally greater than or equal to 128 bits. For example, the length is 256 bits. In the case that the length is greater than or equal to 128 bits, a probability of generating a same seed is extremely low, that is, a probability of using a same seed by two identical plaintexts is extremely low, which is nearly 0, thereby being negligible. Therefore, a numerical value may be randomly generated as a seed. The length of the numerical value is greater than or equal to 128 bits. For example, the length is 256 bits. A manner of randomly generating a numerical value may be a pseudo random number generation (PRNG) algorithm with srand usage time in C language implementation as a random source, or the like.

In a seed generation process, no external hardware device is required, and the seed does not need to reach a true random number generation (TRNG) level. Therefore, the operation is simple.

In the embodiment, customization is performed on the seed, such that an attacker can only passively observe a value of the seed, but cannot modify the value.

For example, a seed generation function is merged into the white-box encryption API and applied with code obfuscation, such that difficulty of code modification is enhanced.

In S103, a mask is generated based on the seed.

As shown in FIG. 2, the MGF generates the mask by taking the seed as an input. A transformation relationship between a seed and a mask is fixed. Therefore, in the case that the seed is unique, the mask is also unique.

In one case, the mask may be generated by using an external hash function.

In this case, a mask having a length equal to the length of the original message may be generated by determining the length of the original message, determining the hash function, and inputting the seed into the hash function for operation.

An input (also referred to as a pre-image) of any length is transformed to an output of a fixed length by using a hashing algorithm. The output is a hash value. The transformation is contractive mapping that makes space of the hash value be far smaller than space of the input. That is, the hash function is a function that contracts a message of any length to a message digest of a fixed length.

In an example, the hash function includes a SHAKE function, for example, SHAKE-128, SHAKE-256, or the like. The SHAKE function may be used to generate an output of any required length.

In this example, the mask having the length equal to the length of the original message may be output by inputting the seed into the SHAKE function for operation. A processing manner may be as follows:

$$F(s,N)=D$$

wherein F( ) denotes the SHAKE function, s denotes the seed, N denotes the length of an output (D), N is equal to the length L of the original message, and D denotes the mask.

Generally, values of L and N are at least 128 bits to avoid a brute-force attack and a rainbow table attack. In a case that a hash collision is also taken into consideration, the value of L needs to be at least 256 bits.

In another example, the hash function includes a secure hash algorithm (SHA) function, for example, SHA-1, SHA-2 or SHA-3.

An idea of the SHA function is to receive a plaintext and irreversibly transform the plaintext into a ciphertext (generally, a smaller text). The process may be simply understood as taking a string of input code (referred to as a pre-image or a message) and converting the string of input code into an output sequence with a relatively short length and fixed bits (160 to 512). The output sequence is a hash value, which is also referred to as a message digest or message authentication code. A value of the hash function may be referred to as a "fingerprint" or "digest" of a plaintext. Therefore, a digital signature of the hash value may be considered as a digital signature of the plaintext.

The SHAKE function is an extensible-output hash function in a SHA-3 family. In this example, SHA-3 denotes SHA3-224, SHA3-256, SHA3-384, and SHA3-512, and does not include the SHAKE function.

In this example, a plurality of new seeds are generated based on the seed. A plurality of pieces of digest information are output by inputting the plurality of new seeds into the SHA function for operation. A first data set is acquired by combining the plurality of pieces of digest information. Data having a length equal to the length of the original message is extracted as the mask from the first data set.

Figure 3A:
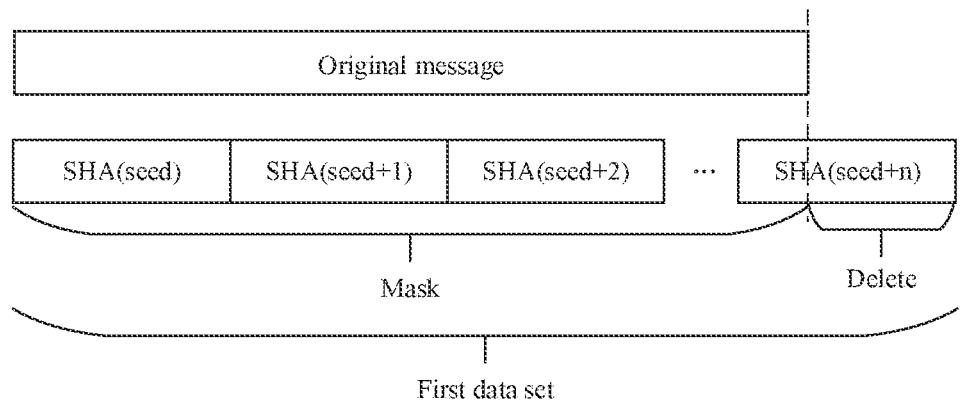
FIG. 3A is an example diagram of generating a mask according to an embodiment of the present disclosure.

The following is described by using SHA-1. As shown in FIG. 3A, SHA-1 generates 160-bit digest information. In the case that the length of the original message is N bits, a total of (N/160+1) pieces of digest information are generated. In the case that N is 200, a total of (200/160+1)=2 pieces of digest information are generated; in the case that N is 320, a total of (320/160+1)=3 pieces of digest information are generated; and so on.

Input of each SHA-1 calculation is the seed plus an increment n, that is, the seed, seed+1, seed+2, . . . , and seed+n (n=0, 1, 2, . . . ). Pieces of digest information are generated by taking the seed, seed+1, seed+2, . . . , and seed+n as the new seeds and inputting the new seeds into SHA-1. The first data set is acquired by sequentially connecting the pieces of digest information.

Finally, data of the first data set that more than N bits are removed from the right-end, and the left N-bit data is the mask.

In one case, no external function is used, and the mask is generated by reusing a white-box encryption function.

In this case, the mask having a length equal to the length of the original message may be generated by determining the length of the original message and performing white-box encryption on the seed.

In the implementation process, a plurality of new seeds may be generated based on the seed. A plurality of ciphertexts are generated by performing the white-box encryption on the plurality of new seeds. A second data set is acquired by combining the plurality of ciphertexts. Data having a length equal to the length of the original message is extracted as the mask from the second data set.

Figure 3B:
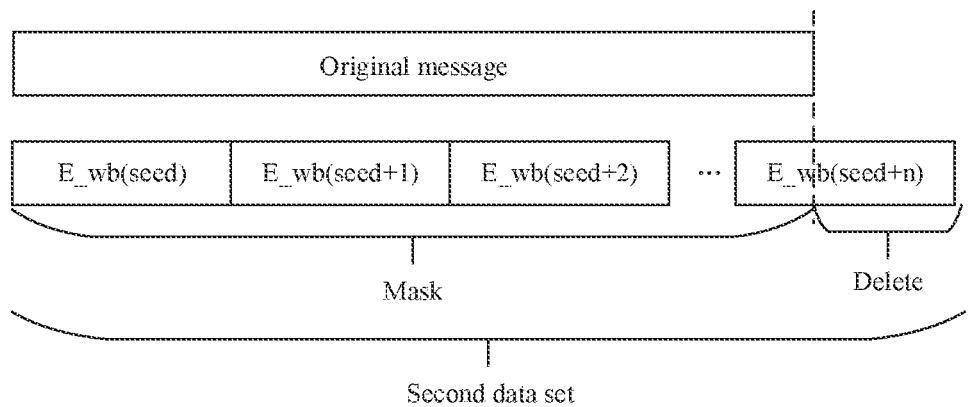
FIG. 3B is another example diagram of generating a mask according to an embodiment of the present disclosure.

In an example, as shown in FIG. 3B, 128-bit ciphertexts are generated by performing the white-box encryption (E_wb). In the case that the length of the original message is N bits, a total of (N/128+1) ciphertexts are generated.

Input of each SHA-1 calculation is the seed plus an increment n, that is, the seed, seed+1, seed+2, . . . , and seed+n (n=0, 1, 2, . . . ). Ciphertexts are generated by taking the seed, seed+1, seed+2, . . . , and seed+n as the new seeds and inputting the new seeds into a white-box encryption (E_wb) function. The second data set is acquired by sequentially connecting the ciphertexts.

Finally, data of the second data set that more than N bits are removed from the right-end, and the left N-bit data is the mask.

The length of the mask is kept equal to the length of the original message, such that an operation such as an exclusive-OR operation can be conveniently performed on the original message and the mask. Alternatively, the length of the mask may be greater than the length of the plaintext. In this case, unnecessary data (that is, data by which the mask is longer than the original message) is removed from the mask when the operation such as the exclusive-OR operation is performed on the original message and the mask, which is not limited in the embodiment.

The above manner of generating the mask is only taken as an example. When the embodiment is implemented, other manners of generating the mask may be set according to actual conditions. The hash function may be a secure one-way hash function of any standard. The hash function includes but is not limited to a SHAKE function and a SHA function, which is not limited in the embodiment. In addition to the above manner of generating the mask, other manners of generating the mask may be applied according to actual needs, which is also not limited in the embodiment.

In S104, a masked message is generated by masking the original message using the mask.

As shown in FIG. 2, the plaintext (the original message) is transformed by applying the mask to the original message, such that the masked message is acquired by masking original content of the original message.

In an example, in the case that the length of the original message is equal to the length of the mask, the masked message may be acquired by performing an exclusive-OR (XOR) operation on the original message and the mask. A formula of the XOR operation is as follows:

$$m'=m \oplus D$$

wherein m denotes the original message, D denotes the mask, and m' denotes the masked message.

The above manner of generating the masked message by performing the XOR operation is only taken as an example. In the implementation process of the embodiment, other manners of generating the masked message may be set according to actual conditions. For example, the masked message is acquired by performing interpolation on the original message using the mask, or the masked message is acquired by substituting the original message and data having the same quantity of bits as the mask into a fixed function expression for operation. When security levels are substantially the same, the speed of the XOR operation is relatively high, such that the XOR operation may be performed preferentially, which is not limited in the embodiment. In addition to the above manner of generating the masked message, other manners of generating the masked message may be applied according to actual needs, which is also not limited in the embodiment.

In S105, a target message is acquired by performing white-box encryption on the masked message.

As shown in FIG. 2, in an ECB mode or the like, a ciphertext may be generated by performing the white-box encryption on the masked message using a white-box encryption algorithm. The ciphertext is taken as the target message.

Because the original message (the plaintext) includes one or more blocks, the target message (the ciphertext) also includes one or more blocks.

The white-box encryption belongs to symmetric encryption. And the white-box encryption is a special encryption method capable of resisting an attack in a white-box environment.

An idea of the white-box encryption is obfuscation. A function of the obfuscation is to disrupt information, thereby enabling the information to exist in a completely un-comprehensible form. In this way, an intermediate process is made as un-comprehensible as possible (that is, only an input and an output can be seen, but how a result is acquired cannot be understood), without affecting a function of the information (an encrypted program cannot be executed before source code is decrypted, but an obfuscated program can be executed correctly).

An algorithm and a key are tightly bound together by the white-box encryption. An encryption table and a decryption table are generated based on the algorithm and the key. In this way, encryption can be performed by searching the encryption table and decryption can be performed by searching the decryption table, instead of depending on the encryption algorithm, the decryption algorithm and the key.

Because the algorithm and the key are combined, the key can be hidden effectively. In addition, encryption logic is obfuscated. An implementation idea of the white-box encryption is to completely replace algorithm performing with table searching. Because the algorithm is known, an encrypted key is known. Therefore, solidifying and representing the algorithm and the key as a table for searching is an implementation process of the white-box encryption.

In the embodiment, an advanced encryption standard (AES) may be implemented in the white-box encryption by performing some customized engineering work, and symmetric key information is stored in an obfuscated lookup table.

Generation of a white-box encryption lookup table follows a same method and components—combined T-box and Ty tables and XOR tables. In addition, the white-box encryption algorithm does not have a compulsory table structure. In some embodiments, generation of the white-box encryption lookup table follows a method and components same as the white-box encryption algorithm meeting the AES. The white-box encryption lookup table is generated based on the combined T-box and Ty tables and the XOR tables.

Therefore, a structure customized in the embodiment may be applied to the table, and an extra mask is added to each table, thereby increasing difficulty of reverse engineering. In addition, internal/external encoding and mixing bijection are also applied to all lookup tables.

During implementation, a binary file having hundreds of kilobytes (KB) is configured to store information of the key. In an encryption/a decryption process, the white-box encryption API reads the binary file to load the key. The binary file is easy to be replaced in a case that the key is changed.

In S106, the target message and the seed are disclosed.

As shown in FIG. 2, the target message and the seed can be disclosed after the ciphertext (that is, the target message) and the seed are acquired.

The white-box encryption belongs to symmetric encryption. And the white-box encryption is a special encryption method capable of resisting an attack in a white-box environment.

The method according to the embodiment includes: determining the original message; generating the seed; generating the mask based on the seed; generating the masked message by masking the original message using the mask; acquiring the target message by performing white-box encryption on the masked message; and disclosing the target message and the seed. The embodiment is also compatible with other white-box encryption algorithms. In addition, the method occupies relatively less resources, has a relatively high computing speed, and can be applied to a mobile environment, thereby filling the gap between an academic design and an industrial requirement, and making the academic design become a practical industrial solution.

The function of generating the mask can be plugged into other white-box encryption algorithms without changing their main logics. Different masks may be generated for different seeds. Identical blocks may be encrypted into different ciphertexts. Therefore, a semantic security function under CPA can be added. With shielding layer protection provided by the mask, difficulty of reverse engineering is enhanced. Therefore, an encryption task can run securely in the ECB mode. Compared with white-box encryption in other non-parallel modes, white-box encryption in the ECB mode has higher efficiency.

The seeds may be treated as dynamic initialization vectors, but do not need to be kept confidential like IVs. Because a mask varies with a seed, identical plaintext blocks may be encrypted into different ciphertext blocks to protect semantic security under CPA. Therefore, the seed contributes to the diffusion of white-box encryption, and an attacker with knowledge of seeds cannot gain any additional advantage to acquire a useful plaintext.

In an example, three plaintexts shown in the following table are encrypted by under-CPA semantically insecure white-box encryption (the second row) and under-CPA semantically secure white-box encryption (the third row) using the same AES-128 symmetric key.

TABLE 1

| | Results of white-box encryption | | |
|---|---|---|---|
| Plaintext | 7ece650eb214c9 7c97438621bda ec791 | 145ad974369b1 5021306a79007 892bb3 | 145ad974369b1 5021306a79007 892bb3 |
| Under-CPA semantically insecure white-box encryption | d4144ff0e4d718 0e8f0ce8803597 e9e8 | 23ab94bc71742 0f89b58d43ab6a 71ec0 | 23ab94bc71742 0f89b58d43ab6a 71ec0 |

TABLE 1-continued

Results of white-box encryption

| Under-CPA semantically secure white-box encryption | f03c572a9c2199 41fee784ae954a 98a4 | 2664e859b1756 97c5fb193c74a 6e2da | 908d8156ec927 6aeda9d37963b 2db336 | 6b89c75c95be5 59db25fc34b1a2 4c9ad |
|---|---|---|---|---|

The last block in the third row is a seed. A 128-bit seed is appended at the end of a ciphertext and is configured to restore a mask value.

It can be seen from the above table that plaintexts in the third block from the left and the fourth block from the left in the first row are the same. And the plaintexts are encrypted into identical ciphertexts by using the under-CPA semantically insecure white-box encryption algorithm (see the third block from the left and the fourth block from the left in the second row). In this case, semantic security under CPA is not considered.

According to the under-CPA semantically secure white-box encryption algorithm in the embodiment of the present disclosure, different masks are generated by using different seeds, to encrypt plaintexts into different ciphertexts. Therefore, a ciphertext in each of the blocks has a unique value.

The under-CPA semantically secure white-box encryption algorithm (AES-128) in the embodiment of the present disclosure is implemented in a C++ project and tested in a mobile environment. An obfuscator-low level virtual machine (OLLVM) is also configured to obfuscate source code. Test results show that:

Extra storage space having about 350 kilobytes is required for a lookup table.

A single encryption operation takes 2.9 milliseconds on average.

Therefore, in a case that the table is integrated with an application, the size of the table is acceptable, and the under-CPA semantically secure white-box encryption algorithm in the embodiment can be deployed in an actual mobile environment. An important reason for following a white-box encryption algorithm is that the table size (hundreds of kilobytes) is affordable.

Embodiment 2

Figure 4:
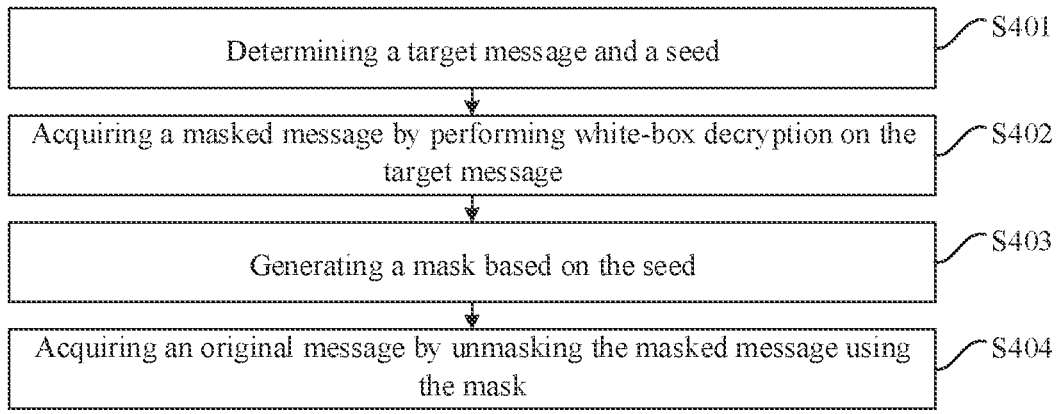
FIG. 4 is a flowchart of a method for decrypting messages according to Embodiment 2 of the present disclosure.

FIG. 4 is a flowchart of a method for decrypting messages according to Embodiment 2 of the present disclosure. The embodiment provides a CPA-resistant white-box decryption scheme. Different ciphertexts are generated for different blocks in a message by adding an MGF. The MGF is merged with a white-box decryption algorithm in a white-box decryption API. The method may be performed by an apparatus for decrypting messages. The apparatus for decrypting messages may be implemented by using software and/or hardware, and may be configured in a computer device, for example, a mobile terminal (such as a mobile phone, a tablet computer, or an intelligent wearable device (such as a smart watch or smart glasses)), a personal computer, a server, or the like.

For a local device such as a mobile terminal and a personal computer, white-box decryption may be implemented in a form of a built-in module of an application, a plugin, or the like.

For a non-local device such as a server, the white-box decryption may be implemented in a form of an SDK. A user first selects a key, and then initializes the white-box decryption based on the key by using the server. After the initialization is completed, a key is generated in a non-plaintext format and stored in a cloud. The application (client) needs to access the key via a cloud API. The white-box decryption implemented on the server eliminates a risk of performing reverse engineering on the local device. The application (client) accomplishes a decryption operation (for example, retrieving a key) by communicating with the server.

As shown in FIG. 4, the method includes the following processes.

In S401, a target message and a seed are determined.

Figure 5:
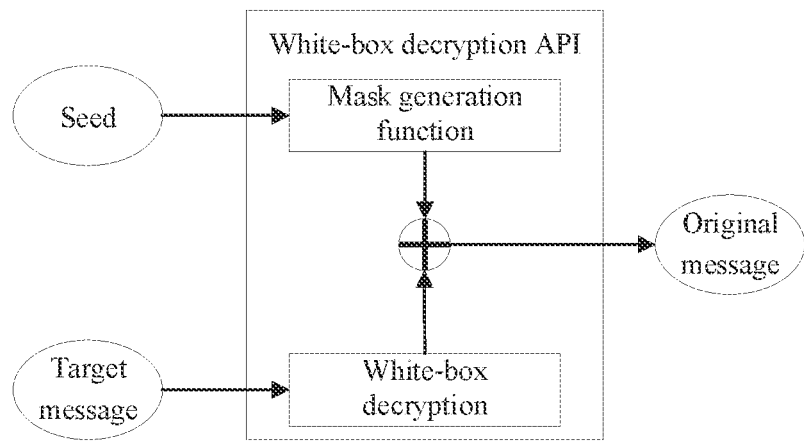
FIG. 5 is a schematic diagram of a white-box decryption API according to an embodiment of the present disclosure.

As shown in FIG. 5, the target message is a ciphertext acquired after a white-box encryption API encrypts an original message by using the seed. The target message and the seed are disclosed together. Therefore, the target message and the seed can be acquired through a disclosing channel. The target message and the seed are provided to the white-box encryption API as an input for decryption.

The seed is unique and not be reused. The seed may be at least one of a number, a string and a character.

A form of the original message varies with a scenario. For example, for a local device such as a mobile terminal, the original message may be a key. That is, key pre-embedding is performed in the white-box decryption manner of this embodiment, which greatly reduces a risk of performing reverse engineering on the local device.

In S402, a masked message is acquired by performing white-box decryption on the target message.

As shown in FIG. 5, in the ECB mode or the like, the masked message may be restored by performing the white-box decryption on the target message using a white-box decryption algorithm. The white-box decryption algorithm for the white-box decryption performed on the target message matches the white-box encryption algorithm for the white-box encryption performed on the masked message.

In this embodiment, an AES can be implemented in the white-box decryption by performing some customized engineering work.

In S403, a mask is generated based on the seed.

As shown in FIG. 5, the MGF generates the mask by taking the seed as the input. A transformation relationship between a seed and a mask is fixed. Therefore, in the case that the seed is unique, the mask is also unique.

In one case, the mask may be generated by using an external hash function.

In this case, the mask having a length equal to the length of the original message may be generated by determining the length of the original message, determining the hash function, and inputting the seed into the hash function for operation.

In an example, the hash function includes a SHAKE function, for example, SHAKE-128, SHAKE-256, or the like. The SHAKE function may be used to generate an output of any required length.

In this example, the mask having the length equal to the length of the original message may be output by inputting the seed into the SHAKE function for operation.

In another example, the hash function includes a SHA function, for example, SHA-1, SHA-2 or SHA-3.

In this example, a plurality of new seeds are generated based on the seed. A plurality of pieces of digest information are output by inputting the plurality of new seeds into the SHA function for operation. A first data set is acquired by combining the plurality of pieces of digest information. Data having a length equal to the length of the original message is extracted as the mask from the first data set.

In another case, no external function is used, and the mask is generated by reusing a white-box encryption function.

In this case, the mask having the length equal to the length of the original message may be generated by determining the length of the original message and performing white-box encryption on the seed.

In the implementation process, a plurality of new seeds may be generated based on the seed. A plurality of ciphertexts are generated by performing the white-box encryption on the plurality of new seeds. A second data set is acquired by combining the plurality of ciphertexts. Data having a length equal to the length of the original message is extracted as the mask from the second data set.

The above manner of generating the mask is only taken as an example. When the embodiment is implemented, other manners of generating the mask may be set according to actual conditions. The hash function may be a secure one-way hash function of any standard. The hash function includes but is not limited to a SHAKE function and a SHA function, which is not limited in the embodiment. In addition to the above manner of generating the mask, other manners of generating the mask may be applied according to actual needs, which is also not limited in the embodiment.

This embodiment is not described in detail because the manner of generating the mask herein is substantially similar to the manner of generating the mask in Embodiment 1. For related details, please refer to description of Embodiment 1. Details are not described in this embodiment.

In S404, an original message is acquired by unmasking the masked message using the mask.

As shown in FIG. 5, the masked message is transformed by applying the mask to the masked message, such that a transformed plaintext (the original message) is acquired by restoring original content of the masked message.

A manner that the white-box encryption API masks the original message by using the mask matches a manner that the white-box decryption API unmasks the masked message by using the mask.

In an example, in the case that the masked message is generated by performing an XOR operation on an original message and a mask, the original message can be acquired by performing the XOR operation on the masked message and the mask. A formula of the XOR operation is as follows:

$$m = m' \oplus D$$

wherein m denotes the original message, D denotes the mask, and m' denotes the masked message.

The above manner of restoring the original message by performing the XOR operation is only taken as an example. In the implementation process of the embodiment, other manners of restoring the original message may be set according to actual conditions. For example, in the case that the masked message is generated by performing interpolation on the original message by using the mask, the original message may be restored by removing interpolation (the mask) from the masked message; or in the case that the masked message is generated by substituting the original message and data having the same quantity of bits as the mask into a fixed function expression for operation, the original message may be restored by substituting the masked message and the data having the same quantity of bits as the mask into the function expression for inverse operation. When security levels are substantially the same, the speed of the XOR operation is relatively high, such that the XOR operation may be performed preferentially, which is not limited in the embodiment. In addition to the above manner of restoring the original message, other fashions of restoring the original message may be applied according to actual needs, which is also not limited in the embodiment.

In the case that the length of the original message is insufficient, the original message may be filled with specified data, such as PKCS #7, before the original message is provided to the white-box encryption API. In this case, the data filled in advance into the original message may be removed from the original message.

In the case that the length of the original message is sufficient, the original message is directly provided to the white-box encryption API as the input. In this case, there is no need to remove, from the original message, data filled in advance into the original message, which is not limited in the embodiment.

The method according to the embodiment includes: determining the target message and the seed; acquiring the masked message by performing white-box decryption on the target message; generating the mask based on the seed; and acquiring the original message by unmasking the masked message using the mask. The embodiment is also compatible with other white-box decryption algorithms. In addition, the method occupies relatively less resources, has a relatively high computing speed, and can be applied to a mobile environment, thereby filling the gap between an academic design and an industrial requirement, and making the academic design become a practically industrial solution.

The function of generating the mask can be plugged into other white-box decryption algorithms without changing their main logics. Different masks may be generated for different seeds. Identical blocks may be encrypted into different ciphertexts. Therefore, a semantic security function under CPA can be added. With shielding layer protection provided by the mask, difficulty of reverse engineering is enhanced. Therefore, a decryption task can run securely in the ECB mode. Compared with white-box decryption in other non-parallel modes, white-box decryption in the ECB mode has higher efficiency.

The seeds may be treated as dynamic initialization vectors, but do not need to be kept confidential like IVs. Because a mask varies with a seed, identical plaintext blocks may be encrypted into different ciphertext blocks to protect semantic security under CPA. Therefore, the seed contributes to the diffusion of white-box decryption, and an attacker with knowledge of seeds cannot gain any additional advantage to acquire a useful plaintext.

Embodiment 3

Figure 6:
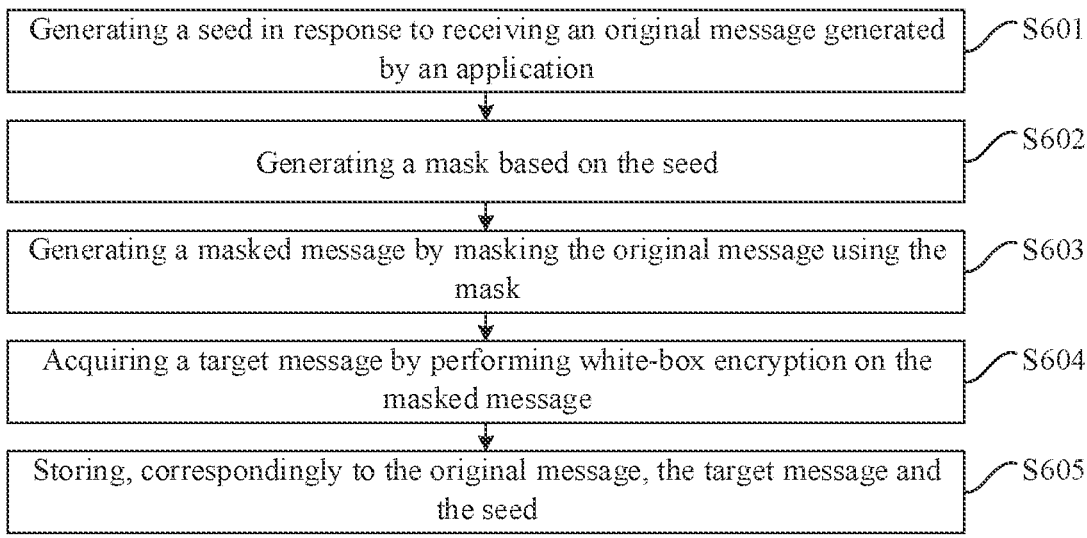
FIG. 6 is a flowchart of a method for writing messages according to Embodiment 3 of the present disclosure.

FIG. 6 is a flowchart of a method for writing messages according to Embodiment 3 of the present disclosure. The embodiment provides a CPA-resistant white-box encryption scheme. Different ciphertexts are generated and stored for different blocks in a message by adding an MGF. The MGF is merged with a white-box encryption algorithm in a white-box encryption API. The method may be performed by an apparatus for writing messages. The apparatus for writing messages may be implemented by using software and/or hardware, and may be configured in a computer device, for example, a mobile terminal (such as a mobile phone, a tablet computer, or an intelligent wearable device (such as a smart watch or smart glasses)), a personal computer, a server, or the like.

For a local device such as a mobile terminal and a personal computer, white-box encryption may be implemented in a form of a built-in module of an application, a plugin, or the like.

For a non-local device such as a server, the white-box encryption may be implemented in a form of an SDK. A user first selects a key, and then initializes the white-box encryption based on the key by using the server. After the initialization is completed, a key is generated in a non-plaintext format and stored in a cloud. The application (client) needs to access the key via a cloud API. The white-box encryption implemented on the server eliminates a risk of performing reverse engineering on the local device. The application (client) accomplishes the encryption operation (for example, retrieving a key) by communicating with the server.

As shown in FIG. 6, the method includes the following processes.

In S601, a seed is generated in response to receiving an original message generated by an application.

In a implementation process, the application may include a browser, an email box, a notepad, an address book, or the like. When the application runs, data of different security levels may be generated.

As shown in FIG. 2, some data of a relatively high security level may be taken as the original message, and provided to a white-box encryption API as an input for encryption.

The original message is a plaintext and may include one or more blocks.

A form of the original message varies with a scenario. For example, for a local device such as a mobile terminal, the original message may be a key. That is, key pre-embedding is performed in the white-box encryption manner of this embodiment, which greatly reduces a risk of performing reverse engineering on the local device.

For another example, data such as contact information may be generated for an address book in a mobile terminal. The contact information may be a name, a mobile number, an avatar, or the like. Generally, after the mobile terminal is unlocked, a user can browse the contact information; and other applications can read the contact information upon being authorized. For some private contact information, the user can request the address book to encrypt the contact information to improve security. In this case, after the mobile terminal is unlocked, the user is not allowed to directly browse the contact information; other applications are not allowed to read the contact information; and the contact information can be browsed upon being decrypted.

As shown in FIG. 2, in response to receiving the input original message, the white-box encryption API may generate the seed. The seed is unique and not be reused. The seed may be at least one of a number, a string and a character. And the seed may be disclosed as an output of the white-box encryption API.

In S602, a mask is generated based on the seed.

As shown in FIG. 2, the MGF generates the mask by taking the seed as the input. A transformation relationship between a seed and a mask is fixed. Therefore, in the case that the seed is unique, the mask is also unique.

In one case, the mask may be generated by using an external hash function.

In this case, the mask having a length equal to the length of the original message may be generated by determining the length of the original message, determining the hash function, and inputting the seed into the hash function for operation.

In an example, the hash function includes a SHAKE function, for example, SHAKE-128, SHAKE-256, or the like. The SHAKE function may be used to generate an output of any required length.

In another example, the hash function includes a SHA function, for example, SHA-1, SHA-2 or SHA-3.

In this example, a plurality of new seeds are generated based on the seed. A plurality of pieces of digest information are output by inputting the plurality of new seeds into the SHA function for operation. A first data set is acquired by combining the plurality of pieces of digest information. Data having a length equal to the length of the original message is extracted as the mask from the first data set.

In another case, no external function is used, and the mask is generated by reusing a white-box encryption function.

In this case, the mask having the length equal to the length of the original message may be generated by determining the length of the original message and performing white-box encryption on the seed.

In the implementation process, a plurality of new seeds may be generated based on the seed. A plurality of ciphertexts are generated by performing the white-box encryption on the plurality of new seeds. A second data set is acquired by combining the plurality of ciphertexts. Data having a length equal to the length of the original message is extracted as the mask from the second data set.

The above manner of generating the mask is only taken as an example. When the embodiment is implemented, other manners of generating the mask may be set according to actual conditions. The hash function may be a secure one-way hash function of any standard. The hash function includes but is not limited to a SHAKE function and a SHA function, which is not limited in the embodiment. In addition to the above manner of generating the mask, other manners of generating the mask may be applied according to actual needs, which is also not limited in the embodiment.

In S603, a masked message is generated by masking the original message using the mask.

As shown in FIG. 2, the plaintext (the original message) is transformed by applying the mask to the original message, such that the masked message is acquired by masking original content of the original message.

In an example, in the case that the length of the original message is equal to the length of the mask, the masked message may be acquired by performing an XOR operation on the original message and the mask.

The above manner of generating the masked message by performing the XOR operation is only taken as an example. In the implementation process of the embodiment, other manners of generating the masked message may be set according to actual conditions. For example, the masked message is acquired by performing interpolation on the original message by using the mask, or the masked message is acquired by substituting the original message and data having the same quantity of bits as the mask into a fixed function expression for operation. When security levels are substantially the same, the speed of the XOR operation is relatively high, such that the XOR operation may be performed preferentially, which is not limited in the embodiment. In addition to the above manner of generating the masked message, other manners of generating the masked message may be applied according to actual needs, which is also not limited in the embodiment.

In S604, a target message is acquired by performing white-box encryption on the masked message.

As shown in FIG. 2, in the ECB mode or the like, a ciphertext may be generated by performing the white-box encryption on the masked message using a white-box encryption algorithm. The ciphertext is taken as the target message.

Because the original message (the plaintext) includes one or more blocks, the target message (the ciphertext) also includes one or more blocks.

In S605, the target message and the seed are stored correspondingly to the original message.

As shown in FIG. 2, after the ciphertext (that is, the target message) and the seed are acquired, the target message and the seed may be stored together in storage space such as a database; and a mapping relationship among the target message, the seed and the original message may be established in the storage space such as the database.

This embodiment is not described in detail because the encryption manner herein is substantially similar to the encryption manner in Embodiment 1. For related details, please refer to description of Embodiment 1. Details are not described in this embodiment.

The method according to the embodiment includes: generating the seed in response to receiving the original message generated by the application; generating the mask based on the seed; generating the masked message by masking the original message using the mask; acquiring the target message by performing white-box encryption on the masked message; and storing, correspondingly to the original message, the target message and the seed. The embodiment is also compatible with other white-box encryption algorithms. In addition, the method occupies relatively less resources, has a relatively high computing speed, and can be applied to a mobile environment, thereby filling the gap between an academic design and an industrial requirement, and improving the academic design to a practically industrial solution.

The function of generating the mask can be plugged into other white-box encryption algorithms without changing their main logics. Different masks may be generated for different seeds. Identical blocks may be encrypted into different ciphertexts. Therefore, a semantic security function under CPA can be added. With shielding layer protection provided by the mask, difficulty of reverse engineering is enhanced. Therefore, an encryption task can run securely in the ECB mode. Compared with white-box encryption in other non-parallel modes, white-box encryption in the ECB mode has higher efficiency.

The seeds may be treated as dynamic initialization vectors, but do not need to be kept confidential like IVs. Because a mask varies with a seed, identical plaintext blocks may be encrypted into different ciphertext blocks to protect semantic security under CPA. Therefore, the seed contributes to the diffusion of white-box encryption, and an attacker with knowledge of seeds cannot gain any additional advantage to acquire a useful plaintext.

Embodiment 4

Figure 7:
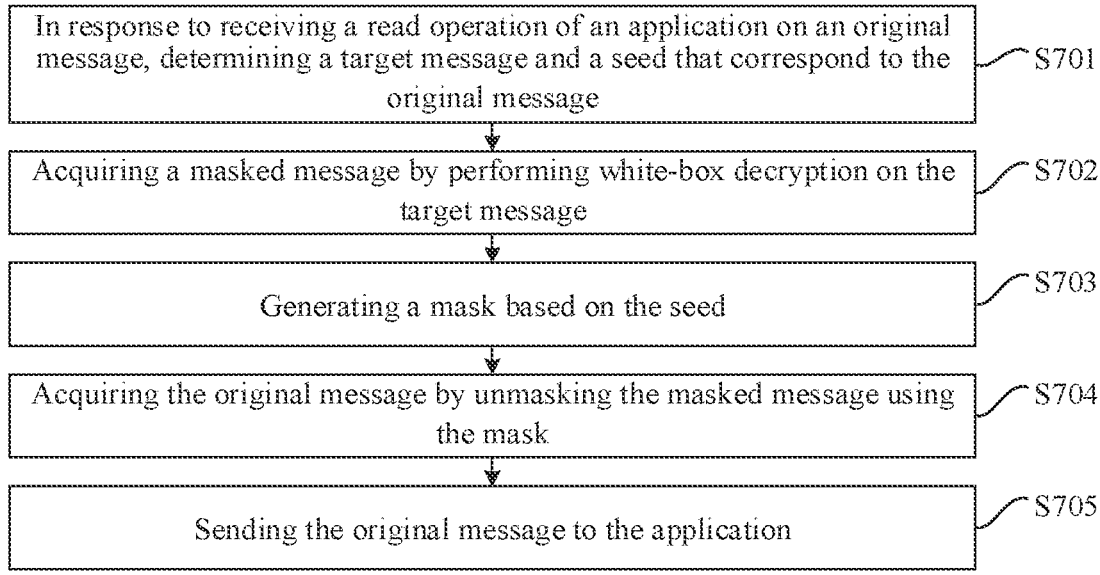
FIG. 7 is a flowchart of a method for reading messages according to Embodiment 4 of the present disclosure.

FIG. 7 is a flowchart of a method for reading messages according to Embodiment 4 of the present disclosure. The embodiment provides a CPA-resistant white-box decryption scheme. Different ciphertexts are generated for different blocks in a message by adding an MGF. The MGF is merged with a white-box decryption algorithm in a white-box decryption API. The method may be performed by an apparatus for reading messages. The apparatus for reading messages may be implemented by using software and/or hardware, and may be configured in a computer device, for example, a mobile terminal (such as a mobile phone, a tablet computer, or an intelligent wearable device (such as a smart watch or smart glasses)), a personal computer, a server, or the like.

For a local device such as a mobile terminal and a personal computer, white-box decryption may be implemented in a form of a built-in module of an application, a plugin, or the like.

For a non-local device such as a server, the white-box decryption may be implemented in a form of an SDK. A user first selects a key, and then initializes the white-box decryption based on the key by using the server. After the initialization is completed, a key is generated in a non-plaintext format and stored in a cloud. The application (client) needs to access the key via a cloud API. The white-box decryption implemented on the server eliminates a risk of performing reverse engineering on the local device. The application (client) accomplishes a decryption operation (for example, retrieving a key) by communicating with the server.

As shown in FIG. 7, the method includes the following processes.

In S701, a target message and a seed that correspond to an original message are determined in response to receiving a read operation of an application on the original message.

As shown in FIG. 5, the target message is a ciphertext acquired after a white-box encryption API encrypts an original message by using the seed. The target message and the seed are stored together in storage space such as a database; and a mapping relationship among the target message, the seed and the original message is stored in the storage space.

In a running process of the application, a read operation is performed as required to read the original message. The target message and the seed can be acquired by searching the storage space based on the mapping relationship. The target message and the seed are provided to the white-box encryption API as an input for decryption.

The seed is unique and not be reused. The seed may be at least one of a number, a string and a character.

In S702, a masked message is acquired by performing white-box decryption on the target message.

As shown in FIG. 5, in the ECB mode or the like, the masked message may be restored by performing the white-box decryption on the target message using a white-box decryption algorithm. The white-box decryption algorithm for the white-box decryption performed on the target message matches the white-box encryption algorithm for the white-box encryption performed on the masked message.

In S703, a mask is generated based on the seed.

As shown in FIG. 5, the MGF generates the mask by taking the seed as the input. A transformation relationship between a seed and a mask is fixed, such that in the case that the seed is unique, the mask is also unique.

In one case, the mask may be generated by using an external hash function.

In this case, the mask having a length equal to the length of the original message may be generated by determining the length of the original message, determining the hash function, and inputting the seed into the hash function for operation.

In an example, the hash function includes a SHAKE function, for example, SHAKE-128, SHAKE-256, or the like. The SHAKE function may be used to generate an output of any required length.

In another example, the hash function includes a SHA function, for example, SHA-1, SHA-2 or SHA-3.

In this example, a plurality of new seeds are generated based on the seed. A plurality of pieces of digest information are output by inputting the plurality of new seeds into the SHA function for operation. A first data set is acquired by combining the plurality of pieces of digest information. Data having a length equal to the length of the original message is extracted as the mask from the first data set.

In another case, no external function is used, and the mask is generated by reusing a white-box encryption function.

In this case, the mask having the length equal to the length of the original message may be generated by determining the length of the original message and performing white-box encryption on the seed.

In the implementation process, a plurality of new seeds may be generated based on the seed. A plurality of ciphertexts are generated by performing the white-box encryption on the plurality of new seeds. A second data set is acquired by combining the plurality of ciphertexts. Data having a length equal to the length of the original message is extracted as the mask from the second data set.

The above manner of generating the mask is only taken as an example. When the embodiment is implemented, other manners of generating the mask may be set according to actual conditions. The hash function may be a secure one-way hash function of any standard. The hash function includes but is not limited to a SHAKE function and a SHA function, which is not limited in the embodiment. In addition to the above manner of generating the mask, other manner of generating the mask may be applied according to actual needs, which is also not limited in the embodiment.

In S704, the original message is acquired by unmasking the masked message using the mask.

As shown in FIG. 5, the masked message is transformed by applying the mask to the masked message, such that a transformed plaintext (the original message) is acquired by restoring original content of the masked message.

A manner that the white-box encryption API masks the original message by using the mask matches a manner that the white-box decryption API unmasks the masked message by using the mask.

In an example, in the case that the masked message is generated by performing an XOR operation on an original message and a mask, the original message can be acquired by performing the XOR operation on the masked message and the mask.

The above manner of restoring the original message by performing the XOR operation is only taken as an example. In the implementation process of the embodiment, other manners of restoring the original message may be set according to actual conditions. For example, in the case that the masked message is generated by performing interpolation on the original message by using the mask, the original message may be restored by removing interpolation (the mask) from the masked message; or in the case that the masked message is generated by substituting the original message and data having the same quantity of bits as the mask into a fixed function expression for operation, the original message may be restored by substituting the masked message and the data having the same quantity of bits as the mask into the function expression for inverse operation. When security levels are substantially the same, the speed of the XOR operation is relatively high, such that the XOR operation may be performed preferentially, which is not limited in the embodiment. In addition to the above manner of restoring the original message, other manners of restoring the original message may be applied according to actual needs, which is also not limited in the embodiment.

In the case that the length of the original message is insufficient, the original message may be filled with specified data, such as PKCS #7, before the original message is provided to the white-box encryption API. In this case, the data filled in advance into the original message may be removed from the original message.

In the case that the length of the original message is sufficient, the original message is directly provided to the white-box encryption API as the input. In this case, there is no need to remove, from the original message, data filled in advance into the original message, which is not limited in the embodiment.

In S705, the original message is sent to the application.

After the original message is acquired through parsing, the original message may be sent to the application to implement the read operation on the original message.

This embodiment is not described in detail because the decryption manner herein is substantially similar to the decryption manner in Embodiment 2. For related details, please refer to description of Embodiment 2. Details are not described in this embodiment.

The method according to the embodiment includes: in response to receiving the read operation of the application on the original message, determining the target message and the seed that correspond to the original message; acquiring the masked message by performing white-box decryption on the target message; generating the mask based on the seed; acquiring the original message by unmasking the masked message using the mask; and sending the original message to the application. The embodiment is also compatible with other white-box decryption algorithms. In addition, the method occupies relatively less resources, has a relatively high computing speed, and can be applied to a mobile environment, thereby filling the gap between an academic design and an industrial requirement, and improving the academic design to a practically industrial solution.

The function of generating the mask can be plugged into other white-box decryption algorithms without changing their main logics. Different masks may be generated for different seeds. Identical blocks may be encrypted into different ciphertexts. Therefore, a semantic security function under CPA can be added. With shielding layer protection provided by the mask, difficulty of reverse engineering is enhanced. Therefore, a decryption task can run securely in the ECB mode. Compared with white-box decryption in another non-parallel mode, white-box decryption in the ECB mode has higher efficiency.

The seeds may be treated as dynamic initialization vectors, but do not need to be kept confidential like IVs. Because a mask varies with a seed, identical plaintext blocks may be encrypted into different ciphertext blocks to protect semantic security under CPA. Therefore, the seed contributes to the diffusion of white-box decryption, and an attacker with knowledge of seeds cannot gain any additional advantage to acquire a useful plaintext.

Embodiment 5

Figure 8:
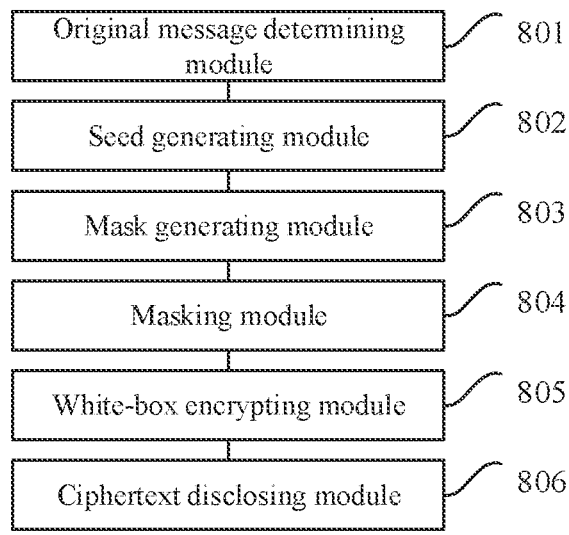
FIG. 8 is a schematic diagram of a structure of an apparatus for encrypting messages according to Embodiment 5 of the present disclosure.

FIG. 8 is a schematic diagram of a structure of an apparatus for encrypting messages according to Embodiment 5 of the present disclosure. The apparatus may include the following modules:

an original message determining module 801, configured to determine an original message; a seed generating module 802, configured to generate a seed; a mask generating module 803, configured to generate a mask based on the seed; a masking module 804, configured to generate a masked message by masking the original message using the mask; a white-box encrypting module 805, configured to acquire a target message by performing white-box encryption on the masked message; and a ciphertext disclosing module 806, configured to disclose the target message and the seed.

Embodiment 6

Figure 9:
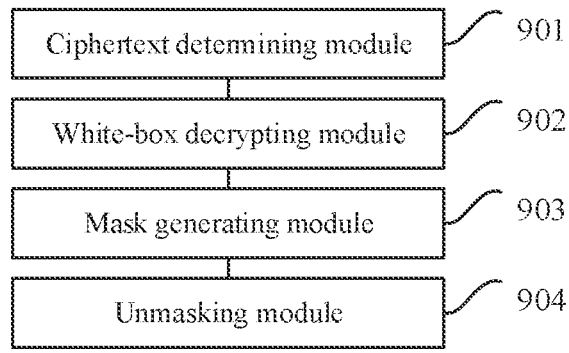
FIG. 9 is a schematic diagram of a structure of an apparatus for decrypting messages according to Embodiment 6 of the present disclosure.

FIG. 9 is a schematic diagram of a structure of an apparatus for decrypting messages according to Embodiment 6 of the present disclosure. The apparatus may include the following modules:
a ciphertext determining module 901, configured to determine a target message and a seed; a white-box decrypting module 902, configured to acquire a masked message by performing white-box decryption on the target message; a mask generating module 903, configured to generate a mask based on the seed; and an unmasking module 904, configured to acquire an original message by unmasking the masked message using the mask.

Embodiment 7

Figure 10:
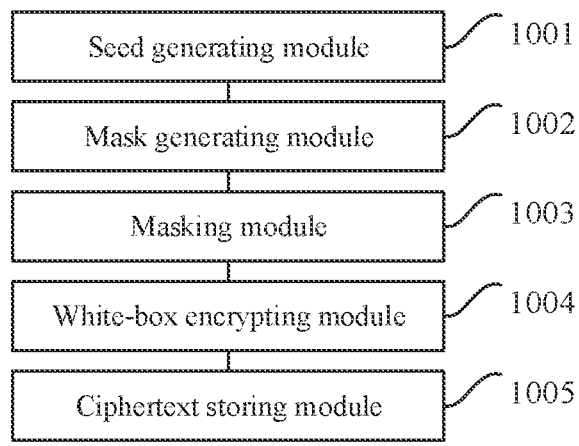
FIG. 10 is a schematic diagram of a structure of an apparatus for writing messages according to Embodiment 7 of the present disclosure.

FIG. 10 is a schematic diagram of a structure of an apparatus for writing messages according to Embodiment 7 of the present disclosure. The apparatus may include the following modules:
a seed generating module 1001, configured to generate a seed in response to receiving an original message generated by an application; a mask generating module 1002, configured to generate a mask based on the seed; a masking module 1003, configured to generate a masked message by masking the original message using the mask; a white-box encrypting module 1004, configured to acquire a target message by performing white-box encryption on the masked message; and a ciphertext storing module 1005, configured to store, correspondingly to the original message, the target message and the seed.

Embodiment 8

Figure 11:
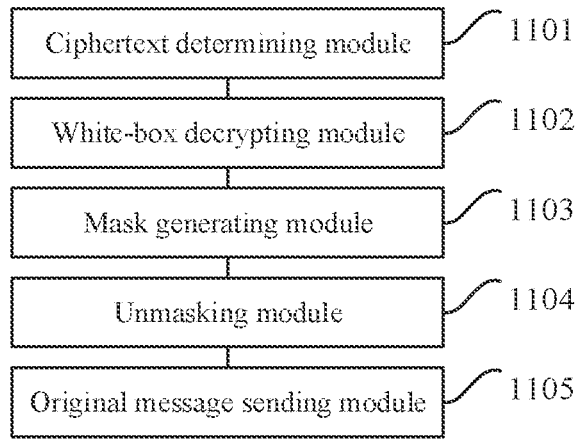
FIG. 11 is a schematic diagram of a structure of an apparatus for reading messages according to Embodiment 8 of the present disclosure.

FIG. 11 is a schematic diagram of a structure of an apparatus for reading messages according to Embodiment 8 of the present disclosure. The apparatus may include the following modules:
a ciphertext determining module 1101, configured to, in response to receiving a read operation of an application on an original message, determine a target message and a seed that correspond to the original message; a white-box decrypting module 1102, configured to acquire a masked message by performing white-box decryption on the target message; a mask generating module 1103, configured to generate a mask based on the seed; an unmasking module 1104, configured to acquire the original message by unmasking the masked message using the mask; and an original message sending module 1105, configured to send the original message to the application.

Embodiment 9

Figure 12:
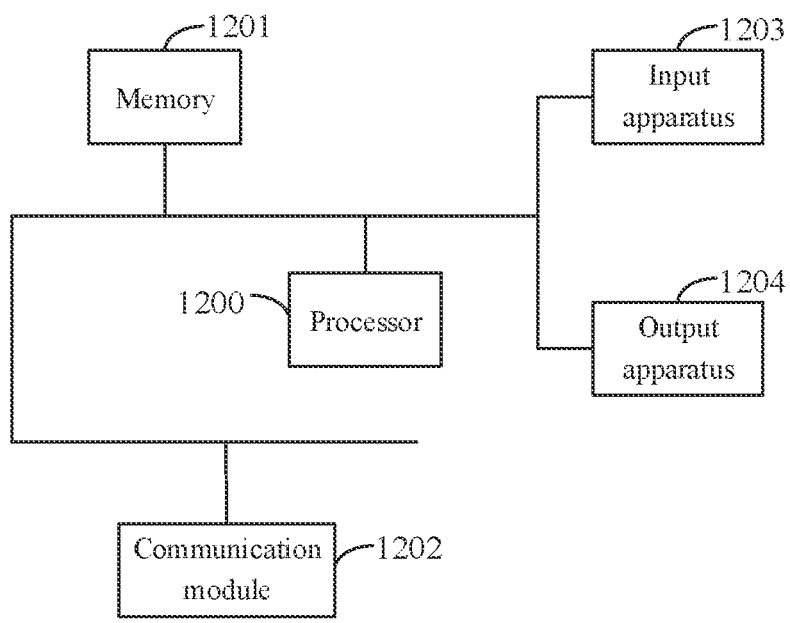
FIG. 12 is a schematic diagram of a structure of a computer device according to Embodiment 9 of the present disclosure.

FIG. 12 is a schematic diagram of a structure of a computer device according to Embodiment 9 of the present disclosure. As shown in FIG. 12, the computer device includes a processor 1200, a memory 1201, a communication module 1202, an input apparatus 1203, and an output apparatus 1204.

The memory 1201 is taken as a non-transitory computer-readable storage medium. The memory 1201 may be configured to store a software program, a computer executable program and a module. For example, the module may be the modules corresponding to the method for encrypting messages in the embodiments (for example, the original message determining module 801, the seed generating module 802, the mask generating module 803, the masking module 804, the white-box encrypting module 805 and the ciphertext disclosing module 806 in the apparatus for encrypting messages, as shown in FIG. 8), the modules corresponding to the method for decrypting messages in the embodiments (for example, the ciphertext determining module 901, the white-box decrypting module 902, the mask generating module 903 and the unmasking module 904 in the apparatus for decrypting messages, as shown in FIG. 9), the modules corresponding to the method for writing messages in the embodiments (for example, the seed generating module 1001, the mask generating module 1002, the masking module 1003, the white-box encrypting module 1004 and the ciphertext storing module 1005 in the apparatus for writing messages, as shown in FIG. 10), or the modules corresponding to the method for reading messages in the embodiments (for example, the ciphertext determining module 1101, the white-box decrypting module 1102, the mask generating module 1103, the unmasking module 1104 and the original message sending module 1105 in the apparatus for reading messages, as shown in FIG. 11). The processor 1200, when loading and running a software program, an instruction or a module stored in the memory 1201, is caused to execute various functional applications and data processing of the computer device. That is, the processor 1200 is caused to perform the above method for encrypting messages, the above method for decrypting messages, the above method for writing messages, or the above method for reading messages.

Embodiment 10

Embodiment 10 of the present disclosure further provides a non-transitory computer-readable storage medium storing a computer program thereon. The computer program, when loaded and run by a processor, causes the processor to perform at least one of the above method for encrypting messages, the above method for decrypting messages, the above method for writing messages, or the above method for reading messages.

What is claimed is:
1. A method for encrypting messages, comprising:
generating a seed by a white-box encryption application programming interface, upon receiving an original message, wherein the seed is unique, and is at least one of a number, a string and a character;
generating a mask based on the seed by: determining a length of the original message; determining a hash function; and generating the mask having a length equal to the length of the original message by inputting the seed into the hash function for operation or determining a length of the original message; and generating the mask having a length equal to the length of the original message by performing white-box encryption on the seed;

generating a masked message by masking an original message using the mask;
acquiring a target message by performing white-box encryption on the masked message; and
disclosing the target message and the seed;
wherein the hash function comprises a SHAKE function or a secure hash algorithm (SHA) function, and generating the mask having the length equal to the length of the original message by inputting the seed into the hash function for operation comprises:
outputting the mask having the length equal to the length of the original message by inputting the seed into the SHAKE function for operation; or
generating a plurality of new seeds based on the seed, outputting a plurality of pieces of digest information by inputting the plurality of new seeds into the SHA function for operation, acquiring a first data set by combining the plurality of pieces of digest information; and extracting data having a length equal to the length of the original message as the mask from the first data set.

2. The method according to claim 1, wherein prior to generating the seed, the method further comprises:
determining the original message; and
filling the original message with specified data in response to a length of the original message being insufficient, and encrypting the original message filled with the specified data.

3. The method according to claim 2, wherein generating the masked message by masking the original message using the mask comprises:
acquiring the masked message by performing an exclusive-OR operation on the original message and the mask.

4. The method according to claim 1, wherein generating the seed comprises:
randomly generating a numerical value as the seed.

5. The method according to claim 1, wherein generating the mask having the length equal to the length of the original message by performing the white-box encryption on the seed comprises:
generating a plurality of new seeds based on the seed;
generating a plurality of ciphertexts by performing the white-box encryption on the plurality of new seeds;
acquiring a second data set by combining the plurality of ciphertexts; and
extracting data having a length equal to the length of the original message as the mask from the second data set.

6. The method according to claim 1, wherein generating the masked message by masking the original message using the mask comprises:
acquiring the masked message by performing an exclusive-OR operation on the original message and the mask.

7. The method according to claim 2, further comprising:
removing, from the original message, data filled in advance into the original message.

8. A computer device, comprising:
at least one processor; and
a memory configured to store at least one program;
wherein the at least one processor, when loading and running the at least one program, is caused to perform the method for encrypting messages as defined in claim 1.

9. A non-transitory computer-readable storage medium, storing a computer program thereon, wherein the computer program, when loaded and run by a processor, causes the processor to perform the method for encrypting messages as defined in claim 1.

10. The method according to claim 1, wherein generating the masked message by masking the original message using the mask comprises:
acquiring the masked message by performing an exclusive-OR operation on the original message and the mask.

11. A method for decrypting messages, comprising:
determining a target message and a seed, wherein the target message is a ciphertext acquired after a white-box encryption application program interface encrypts an original message by using the seed, the target message and the seed are disclosed together, the seed is unique, and is at least one of a number, a string and a character;
acquiring a masked message by performing white-box decryption on the target message;
generating a mask based on the seed by: determining a length of the original message; determining a hash function; and generating the mask having a length equal to the length of the original message by inputting the seed into the hash function for operation or determining a length of the original message; and generating the mask having a length equal to the length of the original message by performing white-box encryption on the seed; and
acquiring an original message by unmasking the masked message using the mask;
wherein the hash function comprises a SHAKE function or a secure hash algorithm (SHA) function, and generating the mask having the length equal to the length of the original message by inputting the seed into the hash function for operation comprises:
outputting the mask having the length equal to the length of the original message by inputting the seed into the SHAKE function for operation; or
generating a plurality of new seeds based on the seed, outputting a plurality of pieces of digest information by inputting the plurality of new seeds into the SHA function for operation, acquiring a first data set by combining the plurality of pieces of digest information; and extracting data having a length equal to the length of the original message as the mask from the first data set.

12. The method according to claim 11, wherein acquiring the original message by unmasking the masked message using the mask comprises:
acquiring the original message by performing an exclusive-OR operation on the masked message and the mask.

13. A computer device, comprising:
at least one processor; and
a memory configured to store at least one program;
wherein the at least one processor, when loading and running the at least one program, is caused to perform the method for decrypting messages as defined in claim 11.

14. A non-transitory computer-readable storage medium, storing a computer program thereon, wherein the computer program, when loaded and run by a processor, causes the processor to perform the method for decrypting messages as defined in claim 11.

15. A method for writing messages, comprising:
generating, in response to receiving an original message generated by an application, a seed by a white-box encryption application programming interface, upon receiving the original message, wherein the seed is unique, and is at least one of a number, a string and a character;

generating a mask based on the seed by: determining a length of the original message; determining a hash function; and generating the mask having a length equal to the length of the original message by inputting the seed into the hash function for operation or determining a length of the original message; and generating the mask having a length equal to the length of the original message by performing white-box encryption on the seed;

generating a masked message by masking the original message using the mask;

acquiring a target message by performing white-box encryption on the masked message; and storing, correspondingly to the original message, the target message and the seed;

wherein the hash function comprises a SHAKE function or a secure hash algorithm (SHA) function, and generating the mask having the length equal to the length of the original message by inputting the seed into the hash function for operation comprises:

outputting the mask having the length equal to the length of the original message by inputting the seed into the SHAKE function for operation; or generating a plurality of new seeds based on the seed, outputting a plurality of pieces of digest information by inputting the plurality of new seeds into the SHA function for operation, acquiring a first data set by combining the plurality of pieces of digest information; and extracting data having a length equal to the length of the original message as the mask from the first data set.

16. A computer device, comprising:
at least one processor; and
a memory configured to store at least one program;
wherein the at least one processor, when loading and running the at least one program, is caused to perform the method for writing messages as defined in claim 15.

17. A non-transitory computer-readable storage medium, storing a computer program thereon, wherein the computer program, when loaded and run by a processor, causes the processor to perform the method for writing messages as defined in claim 15.

* * * * *